US006788435B2

(12) United States Patent
Ouchi et al.

(10) Patent No.: US 6,788,435 B2
(45) Date of Patent: Sep. 7, 2004

(54) IMAGE READER FOR USE IN IMAGE FORMING APPARATUS

(75) Inventors: Takaharu Ouchi, Kawasaki (JP); Yusuke Hashizume, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 649 days.

(21) Appl. No.: 09/749,549

(22) Filed: Dec. 28, 2000

(65) Prior Publication Data

US 2002/0191230 A1 Dec. 19, 2002

(51) Int. Cl.$^7$ ................................................. H04N 1/04
(52) U.S. Cl. ...................... 358/474; 358/483; 358/480; 358/481
(58) Field of Search ............................. 358/474, 483, 358/480, 481

(56) References Cited

U.S. PATENT DOCUMENTS 4,564,864 A * 1/1986 Maeshima ................... 358/444

FOREIGN PATENT DOCUMENTS

JP 10-215347 8/1998
JP 11284805 A * 10/1999 ............ H04N/4/04

* cited by examiner

Primary Examiner—Edward Coles
Assistant Examiner—Heather D Gibbs
(74) Attorney, Agent, or Firm—Foley & Lardner LLP

(57) ABSTRACT

An image reader of the present invention comprises a fluctuation detector that can be connected to the external equipment by means of an image data input-output section, and can subject image data, continuous in a first direction and outputted as image information on a test chart is photoelectrically converted by means of a CCD sensor when a mirror set or the test chart is moved in the first direction, to Fourier conversion, thereby obtaining the frequency of a fluctuation of the obtained image data and a maximum value of the amplitude thereof. If the obtained maximum value of the fluctuation amplitude is greater than a given value, the fluctuation detector is used to compare the frequency of the fluctuation and the natural frequency of a drive motor for generating driving force for moving the mirror set or the image. If the fluctuation frequency and the natural frequency are not equal, the value of current supplied to the drive motor is increased.

19 Claims, 7 Drawing Sheets

IMAGE READER FOR USE IN IMAGE FORMING APPARATUS

BACKGROUND OF THE INVENTION

The present invention relates to an image reader capable of obtaining image data for an electrophotographic image forming apparatus, for example, and the image forming apparatus provided with the image reader.

A image reader (scanner) for obtaining image data for an image forming apparatus comprises a transparent document holder (document glass), illumination unit, CCD sensor, optical set, etc. The document glass is a substantially rectangular plate that serves to hold an object of reading, such as a sheetlike document, book, or cubic body. The illumination unit, which includes an illuminating lamp and a reflector, illuminates the object of reading set on the document glass. The CCD sensor receives reflected light from the object of reading that is illuminated with illumination light from the illumination unit, and converts an image contained in the object of reading into an electrical signal. The optical set includes a plurality of mirrors and reduced-scale lenses that are interposed between the document glass and the CCD sensor. An analog electrophotographic apparatus is designed so that an exposure mirror and a photoconductor drum are provided in place of the CCD sensor and that reflected light from the object of reading is guided directly to the drum. In this apparatus, a document glass (document holder), illumination unit, and optical set are arranged in like manner.

In the scanner (image reader) of this type, the illumination unit and a first mirror, which is located near the illumination unit and serves to reflect the reflected light from the object of reading in a given direction, are assembled together as a first carriage, which is movable along the document glass. Further, second and third mirrors, which serve successively to return the reflected light from the first mirror toward the CCD sensor, are arranged between the first mirror and the CCD sensor. They are assembled together as a second carriage, which is movable without changing its position relative to the first carriage.

The first and second carriages are moved so that the speed of the second carriage is half that of the first carriage, by means of a motor for generating driving force, a wire or belt for transmitting the driving force of the motor to the first and second carriages, and a reduction gear mechanism that reduces the rotational frequency of the motor as it adjusts the torque to a given value.

The reduction gear mechanism is composed of, for example, a motor pulley mounted on the shaft of the motor, a plurality of reduction pulleys arranged between the wire (or belt) and the motor pulley and capable of further reducing the driving force (rotational frequency) supplied to the motor pulley, and a plurality of timing belts or gear trains for transmitting the driving force between the reduction pulleys.

Thus, the image reader is a continuous physical system that includes a plurality of movable parts and movable components, such as the motor, wire or belt, first and second carriages, reduction gear mechanisms, etc. These parts and components have their respective natural frequencies that depend on their materials, shapes, methods of assembly, etc. It is known that they resonate to one another if their natural frequencies are equal.

If any oscillation is caused during the image reading operation of the image reader, then the quality of read image data will inevitably be lowered. For example, the image data quality may be lowered by a longitudinal-line fluctuation such that at least one of the carriages are staggered or moved in zigzags so that the CCD sensor inevitably reads image data as an image that oscillates in the advancing direction of the carriage.

At the time of shipment, the movable parts and components are assembled, adjusted, or shaped in an optimum state without resonation of the natural frequencies. Due to aging or prolonged use, however, the respective natural frequencies of the movable parts and components may change and undergo resonation.

If the quality of the read image data is lowered by resonance, it may possibly be improved by adjusting the tension on the wire or the torque of the drive motor. In most cases, however, the adjustment takes a lot of time. In many cases, moreover, the adjustment cannot improve the data quality. In these cases, it is necessary to recover and readjust the apparatus in the production line or plant or replace its defective parts or components.

BRIEF SUMMARY OF THE INVENTION

An object of the present invention is to provide an image reader capable of maintaining high quality of read image data for a long period of time.

Another object of the invention is to provide an image reader designed so that an object of reading or a combination of an illumination mechanism and an optical set is moved and image information on the object is converted into an electrical signal, in which the quality of read image data cannot be lowered by oscillations of movable parts and movable components.

Still another object of the invention is to provide an image reader designed so that an object of reading or a combination of an illumination mechanism and an optical set is moved and image information on the object is converted into an electrical signal, in which resonation of the respective natural frequencies of movable parts and movable components can be reduced so that high-quality image data can be outputted, or an image forming apparatus including the image reader.

According to the present invention, there is provided an image reader comprising: a CCD sensor for converting image information into image data composed of electrical signals; a mirror set for transmitting image data on an object of reading to the CCD sensor; a movement mechanism for moving the mirror set and/or the object of reading at a given speed; a drive unit for applying driving force to the movement mechanism; and a driving force control mechanism adapted to change the value of drive current supplied to the drive unit when a peak of a fluctuation frequency detected by means of a fluctuation detector is equal to the natural frequency of the drive unit, the fluctuation detector being externally connectable and capable of processing an output signal from the CCD sensor and detecting the fluctuation frequency attained as the movement mechanism is moved and the peak of the fluctuation frequency.

According to the invention, moreover, there is provided an image reader comprising: a CCD sensor for converting image information into image data composed of electrical signals, a mirror set for transmitting image data on an object of reading to the CCD sensor; a movement mechanism capable of moving the mirror set and/or the object of reading at a given speed; a drive unit for generating driving force; a driving force transmission mechanism for transmitting the driving force generated by the drive unit to the movement mechanism; and a transmission condition changing mechanism for changing a condition for the transmission of the driving force generated by the drive unit when a peak of a fluctuation frequency detected by means of a fluctuation detector is equal to the natural frequency of the drive unit, the fluctuation detector being externally connectable and capable of processing an output signal from the CCD sensor and detecting the fluctuation frequency attained as the movement mechanism is moved and the peak of the fluctuation frequency.

According to the invention, furthermore, there is provided a method for detecting and restraining a fluctuation of an image of an image reader, comprising: transmitting image information on a straight-line image, extending in a first direction and having a length equal to the width of each pixel in a second direction perpendicular to the first direction, to a light receiving surface of a CCD sensor by means of a mirror set; moving the mirror set or the image in the first direction so that image data, continuous in the first direction and photoelectrically converted by means of the CCD sensor, is subjected to Fourier conversion; obtaining the frequency of a fluctuation of the image data obtained by the Fourier conversion and a maximum value of the amplitude thereof; comparing the frequency of the fluctuation with the natural frequency of a drive motor for generating driving force for moving the mirror set or the image in the case where the maximum value of the amplitude of the fluctuation is greater than a given value; increasing the level of current supplied to the drive motor in the case where the frequency of the fluctuation and the natural frequency are equal; and changing a condition for the transmission of the driving force from the drive motor to a mechanism for moving the mirror set or the image in the case where the frequency of the fluctuation and the natural frequency are not equal.

According to the invention, moreover, there is provided an image reader comprising: a transparent plate member for holding a test chart carrying thereon an image extending in a first direction and having a length equal to the width of each pixel in a second direction perpendicular to the first direction; an illuminating device capable of illuminating the test chart set on the plate member, thereby obtaining reflected light containing image information on the test chart; a CCD sensor for photoelectrically converting the reflected light and outputting image data corresponding to the image information; a mirror member for transmitting the reflected light toward the CCD sensor; a carriage member for moving the illuminating device and the mirror member along the transparent plate member; a motor for generating driving force; a driving force transmission member for transmitting the driving force generated by the motor to the carriage member; and an image data input-output section connected with a fluctuation detector externally connectable and capable of processing the image data delivered from the CCD sensor and detecting the fluctuation frequency attained as the carriage member is moved and the peak of the fluctuation frequency.

According to the invention, furthermore, there is provided a system capable of reducing fluctuation components of read image data attributable to oscillations of movable parts and movable components of an image reader having the movable parts and components and resonance of the whole image reader, comprising: a transparent plate member for holding an object of reading including a test chart; an illuminating device capable of illuminating the object of reading set on the plate member, thereby obtaining reflected light containing image information on the object of reading; a CCD sensor for photoelectrically converting the reflected light and outputting image data corresponding to the image information; a mirror set for transmitting the reflected light toward the CCD sensor; a carriage member for moving the illuminating device and the mirror set along the transparent plate member; a motor for generating driving force; a driving force transmission member for transmitting the driving force generated by the motor to the carriage member; and an image data input-output section connected with a fluctuation detector externally connectable and capable of processing the image data delivered from the CCD sensor and detecting the fluctuation frequency attained as the carriage member is moved and the peak of the fluctuation frequency, wherein the image information on the test chart is transmitted to a light receiving surface of the CCD sensor by means of the mirror set, the image data continuous in a first direction, outputted as the image information on the test chart is photoelectrically converted by means of the CCD sensor when the mirror set or the test chart is moved in the first direction, is subjected to Fourier conversion by means of the fluctuation detector connected by means of the image data input-output section, the frequency of a fluctuation of the image data obtained by the Fourier conversion and a maximum value of the amplitude thereof are obtained, the frequency of the fluctuation is compared with the natural frequency of the drive motor for generating the driving force for moving the mirror set or the image when the maximum value of the amplitude of the fluctuation obtained by means of the fluctuation detector is greater than a given value, the value of current supplied to the drive motor is increased when the fluctuation frequency and the natural frequency are equal, and a condition for the transmission of the driving force from the drive motor to a mechanism for moving the mirror set or the image is changed when the fluctuation frequency and the natural frequency are not equal, in the case where the object of reading is the test chart containing the image information on a straight-line image having a length equal to the width of each pixel in a second direction perpendicular to the first direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A digital copying apparatus as an example of an image forming apparatus according to an embodiment of the present invention will now be described with reference to the accompanying drawings.

Figure 1:
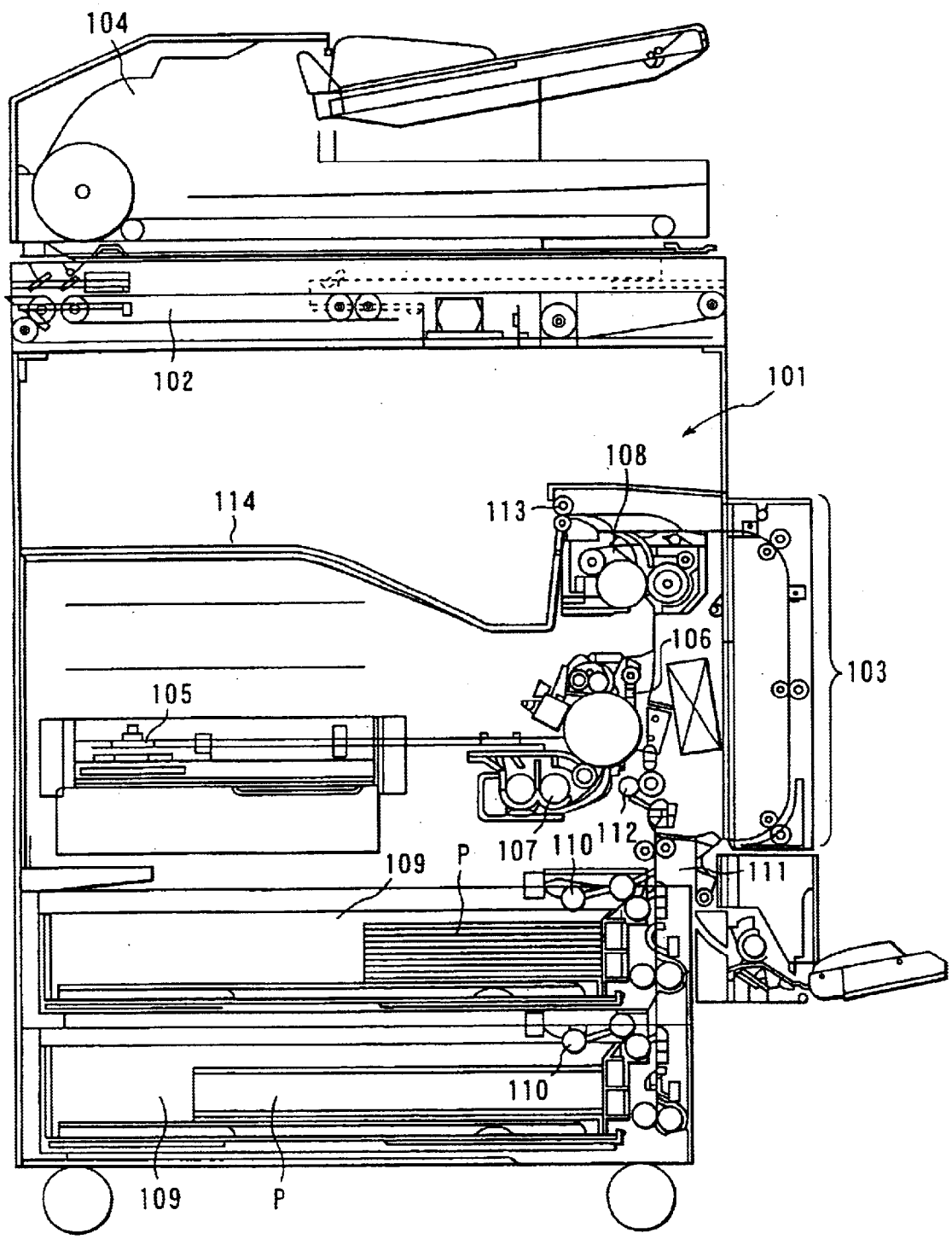
FIG. 1 is a schematic view illustrating an example of an image forming apparatus to which an image reader of the present invention is applied.

As shown in FIG. 1, a digital copying apparatus 101 comprises a scanner 102 and an image forming unit 103. The scanner 102 reads image information on an object of copying as light gradation and generates an image signal. The image forming unit 103 forms an image that corresponds to an image signal supplied from the scanner 102 or an external apparatus. The scanner 102 is provided integrally with an automatic document feeder (ADF) 104, which successively change objects of copying in association with the image reading operation of the scanner 102 in the case where the objects are sheets.

The image forming unit 103 includes an exposure device 105, photoconductor drum 106, developing device 107, fixing device 108, etc. The exposure device 105 applies a laser beam that corresponds to image information supplied from the scanner 102 or the external apparatus. The drum 106 holds an image that corresponds to the laser beam from the exposure device 105. The developing device 107 supplies a developer to the image on the drum 106, thereby developing the image. The fixing device 108 heats and melts a developer image, developed on the photoconductor drum 106 by means of the developing device 107 and transferred to a transfer medium that is fed by means of a sheet feeding unit (mentioned later), and fixes the image to the transfer medium.

When the image information is supplied from the scanner 102 or the external apparatus, a laser beam of which the intensity is modulated by means of the image information is radiated from the exposure device 105 and applied to the photoconductor drum 106 that is previously charged to a given potential. Thereupon, an electrostatic latent image corresponding to the image to be copied is formed on the drum 106.

The electrostatic latent image formed on the photoconductor drum 106 is developed and changed into a toner image (not shown) as it is selectively supplied with a toner T by means of the developing device 107. The toner image on the surface of the drum 106 is transferred to each of sheets P that are fed into a transfer position opposite to a transfer device (denoted by no numeral). The sheets P, transfer media, are delivered one after another from a sheet cassette 109 by means of a pickup roller 110, transported along a conveyor path 111 that is directed to the photoconductor drum 106, and timed to the toner image (developer image) on the drum 106 by means of aligning rollers 112 for position alignment with the toner image.

The toner T transferred to each sheet P is transported to the fixing device 108, whereupon it is melted and fixed to the sheet P.

On the other hand, the sheet P, having the toner image fixed thereon by means of the fixing device 108, is discharged by means of exit rollers 113 into a discharge space (receiving tray) 114 that is defined between the scanner 102 and the sheet cassette 109.

Figure 2:
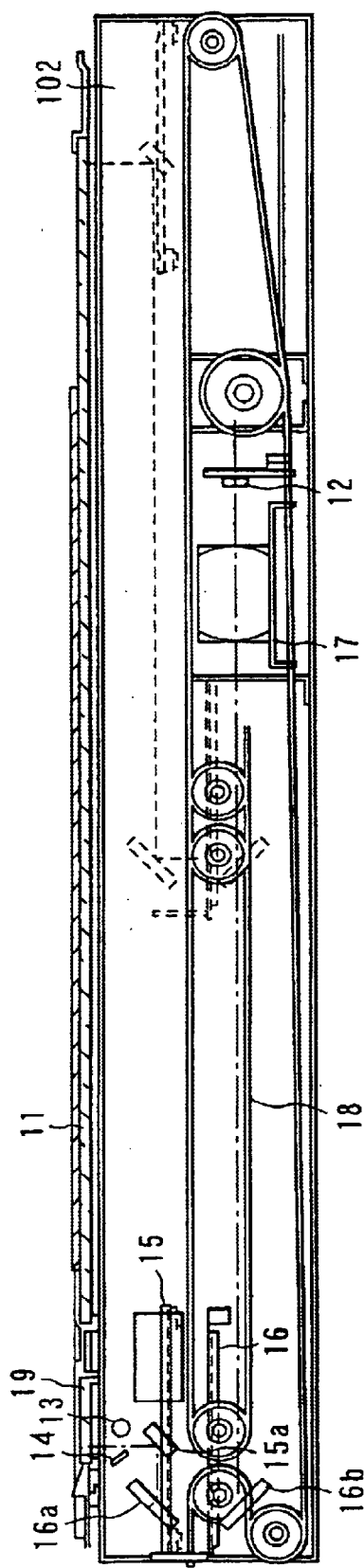
FIG. 2 is a schematic view illustrating the image reader incorporated in the image forming apparatus shown in FIG. 1.

FIG. 2 is a schematic view for illustrating an example of an image reader (scanner) that is incorporated in the image forming apparatus shown in FIG. 1.

As shown in FIG. 2, the scanner 102 is provided with a document glass 11 and a CCD sensor 12 that are located in predetermined positions, individually. The glass 11 is a transparent flat plate with a substantially uniform thickness, which serves to hold a document D as an object to be read (or copied). The sensor 12 serves to convert image information on the document D that is transmitted by means of a plurality of mirrors (mentioned later) into electrical signals.

A tubular illuminating lamp 13 and a reflector 14 are arranged in a space near the surface of the document glass 11 opposite from that surface on which the document D is set. The lamp 13, which extends along one side of the glass 11, illuminates the document D that is intimately in contact with the glass 11. The reflector 14 reflects light from the lamp 13 toward the document D on the glass 11. The illuminating lamp 13 and the reflector 14 are longer than each side of the document D that can be set on the document glass 11.

The illuminating lamp 13 and the reflector 14 are fixed to a first carriage 15 that is movable along the surface of the document glass 11. The first carriage 15 is moved at a given speed toward another side of the glass 11 that extends at right angles to the one side. Thus, an image of the document D is fetched as light gradation with respect to an elongate irradiation range that is defined by the lamp 13 and the reflector 14 and extends long in a first direction, reflected successively by a plurality of mirrors (mentioned later), and guided to the light receiving surface of the CCD sensor 12. AS the lamp 13 and the reflector 14 are moved toward the other side (in a second perpendicular to the first direction), moreover, an image of the whole area of the document D is fetched in regular order as light gradation and guided to the light receiving surface of the sensor 12.

The first carriage 15 is further provided with a first image mirror 15a. As the document D, which is illuminated by illumination light from the illuminating lamp 13 and illumination light reflected by the reflector 14 and has an image to be read or reflected image light, is illuminated, the mirror 15a guides the reflected light or light gradation that is attributable to the difference in reflectance between the image and non-image of the document D.

Second and third image mirrors 16a and 16b for guiding light from the first image mirror 15a of the first carriage 15 in a given direction are arranged in the direction in which the reflected light from the document D reflected by the first image mirror 15a is guided. The second and third image mirrors 16a and 16b are arranged so that their respective reflecting surfaces extend at right angles to each other. When the first carriage 15 is moved parallel to the document glass 11, moreover, the mirrors 16a and 16b are incorporated integrally in the second carriage 16 that is moved following the first carriage 15 at the given speed. Thus, the reflected light from the document D guided by the first image mirror 15a of the first carriage 15 is returned within a plane parallel to the surface of the glass 11.

A lens 17 for applying a given reduced scale factor to the image light from the document D reflected by the third image mirror 16b of the second carriage 16 is located in the direction in which the reflected image light is guided. The reflected light from the third image mirror 16b is a belt-shaped lit that is restricted by the overall axial length of the illuminating lamp 13 and a width that is defined as the first image mirror 15a reflects the image light from the document D.

The CCD sensor 12, which has the light receiving surface for receiving light, is located in the focal position of the lens 17 so that the light receiving surface is aligned with the focal position. The sensor 12 photoelectrically converts the light applied to the light receiving surface and outputs an electrical signal that corresponds to the light intensity.

Figure 3:
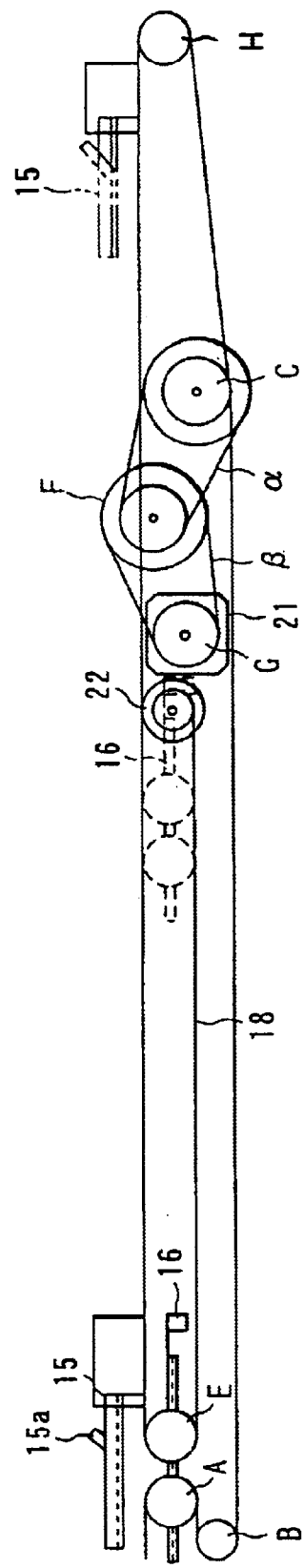
FIG. 3 is a schematic view illustrating a drive system for the image reader shown in FIG. 2.

The first and second carriages 15 and 16 are reciprocated along the document glass 11 by means of a wire rope 18 that is moved at a give speed by means of a drive motor 21 (shown in FIG. 3). The moving speed of the carriages 15 and 16, that is, the rotational frequency of the motor 21, is set corresponding to a reading scale factor that is entered (or specified) through a control panel (not shown) or the external apparatus when the image information on the document D is read.

A white-level reference value used when the CCD sensor 12 photoelectrically converts the image of the document D is calibrated in accordance with reflected light that is obtained as a white reference plate 19 is illuminated by means of the illuminating lamp 13 and the reflector 14, or when the image reader (image forming apparatus) is activated, for example. The reference plate 19 is located in a predetermined position (home position) short of the leading end of the document glass 11 in the second direction as the first carriage 15 is moved along the glass 11.

FIG. 3 is a schematic view illustrating the relationships between the drive motor, the wire rope, a gear train, etc. for reciprocating the first and second carriages of the scanner shown in FIG. 2 along the document glass.

As shown in FIG. 3, the first and second carriages 15 and 16 of the scanner 102 are moved along the document glass 11 by means of the wire rope 18 that is moved at the give speed corresponding to the reading scale factor as the drive motor 21 rotates.

The wire rope 18, extending from its fixed end fixed to a frame (not shown), for example, is passed around a pulley A of the second carriage 16 to be substantially returned, and then returned again by means of a pulley B on the frame. Thereafter, the rope 18 is wound for several turns around a pulley C (take-up pulley), to which the rotation of the drive motor 21 is to be transmitted next, so as to be able to transmit the rotation of the motor 21. Then, the rope 18 is returned again by means of a pulley H that is spaced from the pulley B and fixed to the frame, and is passed around a pulley E of the second carriage 16. The pulley C is a reduction pulley, which is rotated at a given speed as a motor pulley G rotates. The pulley G is mounted on the shaft of the drive motor 21 that is reduced in speed by means of transmission elements, such as toothed belts α and β, and an intermediate reduction pulley F.

Further, the first carriage 15 is fixed to the wire rope 18 at a point between the pulley E of the second carriage 16 and the pulley D on the frame. As the drive motor 21 is rotated, according to this arrangement, the first and second carriages 15 and 16 are moved at speeds in the ratio of 2:1. Naturally, the first carriage 15 is moved twice as long as the second carriage 16 is. The wire rope 18, which is returned by means of the pulley E, is fixed to a wire motor 22 that changeably maintains tension on the rope 18. Thus, the tension on the wire rope 18 is changed as the wire motor 22 is slightly rotated under the control of a control element (mentioned later), in order to correct a longitudinal-line fluctuation, which will described later.

Figure 4:
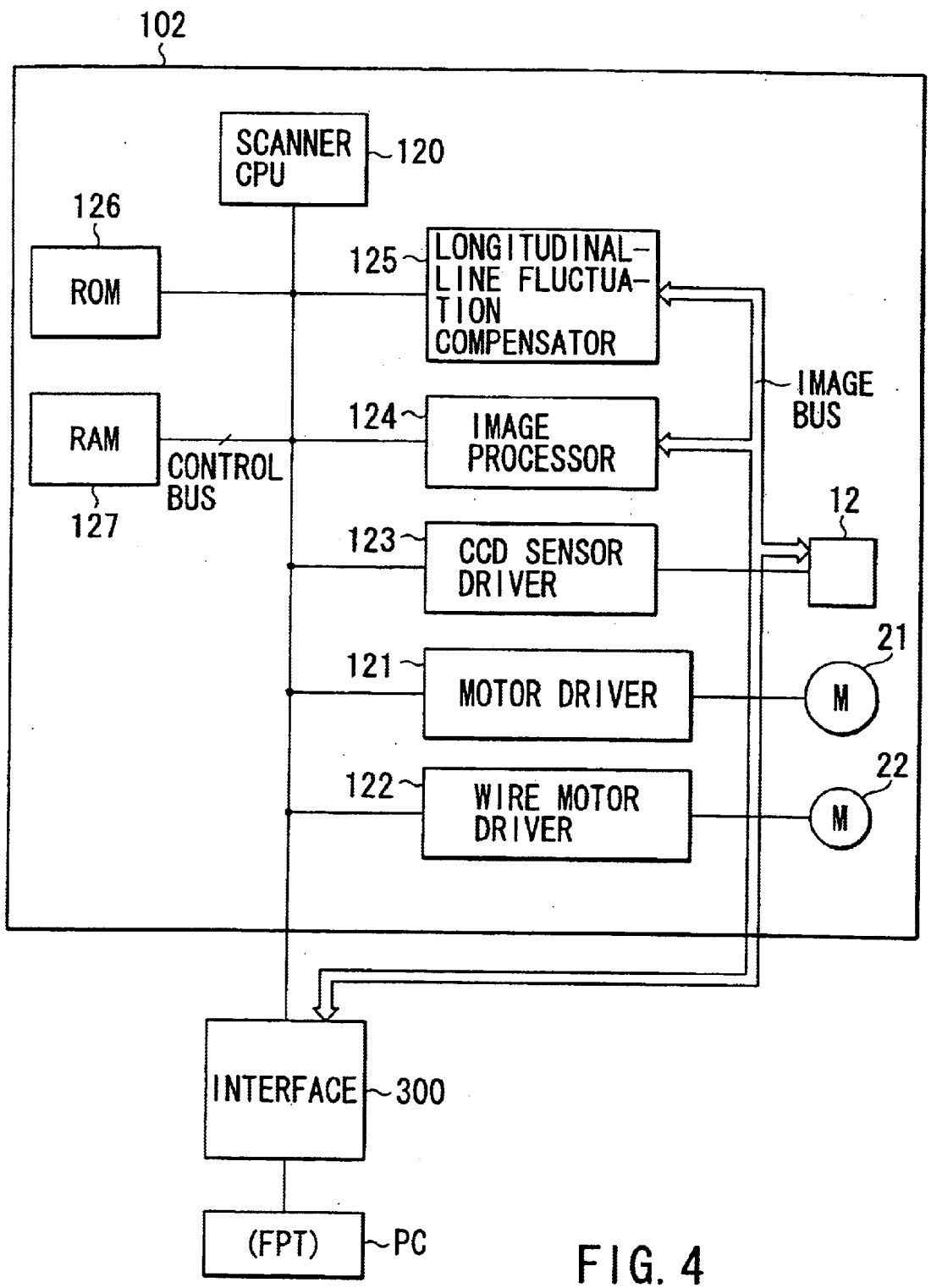
FIG. 4 is a block diagram illustrating an example of a control system for the image reader shown in FIGS. 2 and 3.

FIG. 4 is a schematic view illustrating a control system for the scanner shown in FIGS. 2 and 3 and the image forming apparatus shown in FIG. 1.

Figure 8:
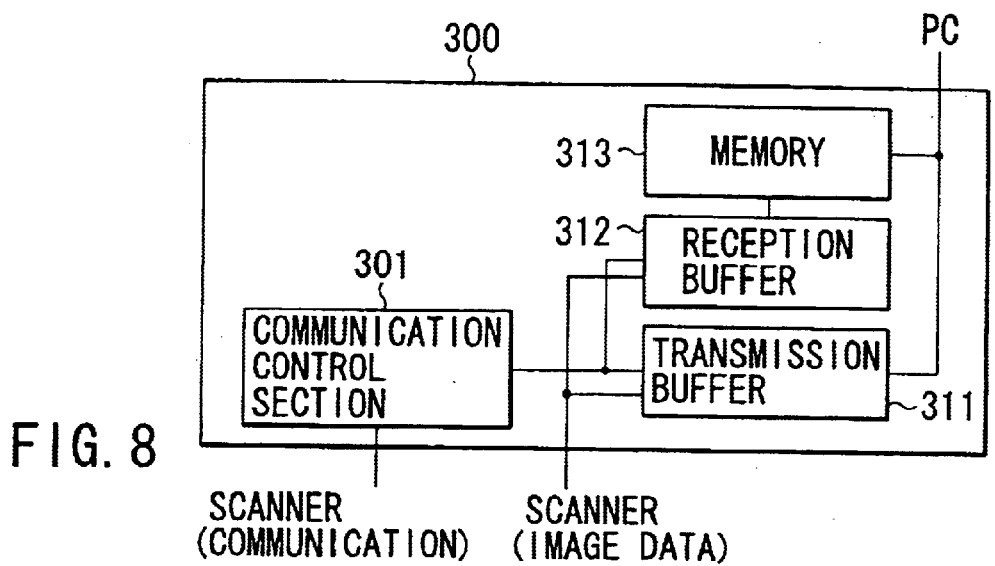
FIG. 8 is a block diagram illustrating an example of an interface between a personal computer and the image reader used in the longitudinal-line fluctuation reducing method shown in FIG. 5.

As shown in FIG. 4, the scanner 102 comprises a scanner CPU 120, motor driver 121, wire motor driver 122, CCD sensor driver 123, image processor 124, longitudinal-line fluctuation compensator 125, ROM 126, RAM/27 as a working memory, etc. The scanner CPU 120 controls the following elements that constitutes the scanner 102. The motor driver 121 rotates the drive motor 21 at a given speed and in a given direction in order to move the first and second carriages 15 and 16 at the given speed. The CCD sensor driver 123 drives the CCD sensor 12 in order to convert photoelectrically the image information or the reflected light from the document D that is guided to the sensor 12, thereby obtaining image data. The image processor 124 subjects the image signal delivered from the CCD sensor 12 to shading correction, and carries out image processing, such as γ-correction or removal of noise components, in order to match the correlation between an output signal level and the density value of the output image, which is a possible image output characteristic of the image forming unit 103, to the correlation between the output signal level and the density value of the output data from the CCD sensor 12. The longitudinal-line fluctuation compensator 125, based on the level of the longitudinal-line fluctuation required by a longitudinal-line fluctuation detector PC (personal computer) PC that can be connected to the scanner 102, executes a longitudinal-line fluctuation compensation routine for reducing the longitudinal-line fluctuation, which will be described later. The ROM 126 is previously stored with operation programs of the CPU 120. The longitudinal-line fluctuation detector PC includes a program for FFT (fast Fourier transform) analysis, whereby the level of the longitudinal-line fluctuation is discriminated, for example. The detector PC can be connected to the scanner 102 through an interface 300, which will be described later with reference to FIG. 8, and can obtain the level of the longitudinal-line fluctuation according to the longitudinal-line fluctuation compensation routine, which will be described later with reference to FIG. 5. Further, the longitudinal-line fluctuation compensator 125 can change the tension on the wire rope 18 or the value of motor current supplied to the drive motor 21, for example, depending on the level of the longitudinal-line fluctuation that can be obtained according to the longitudinal-line fluctuation compensation routine, in accordance with a longitudinal-line fluctuation measurement chart M with a special image pattern that carries a longitudinal line having a width equal to the width of each pixel and extending in a direction parallel to the moving direction of the first and second carriages 15 and 16.

Figure 5:
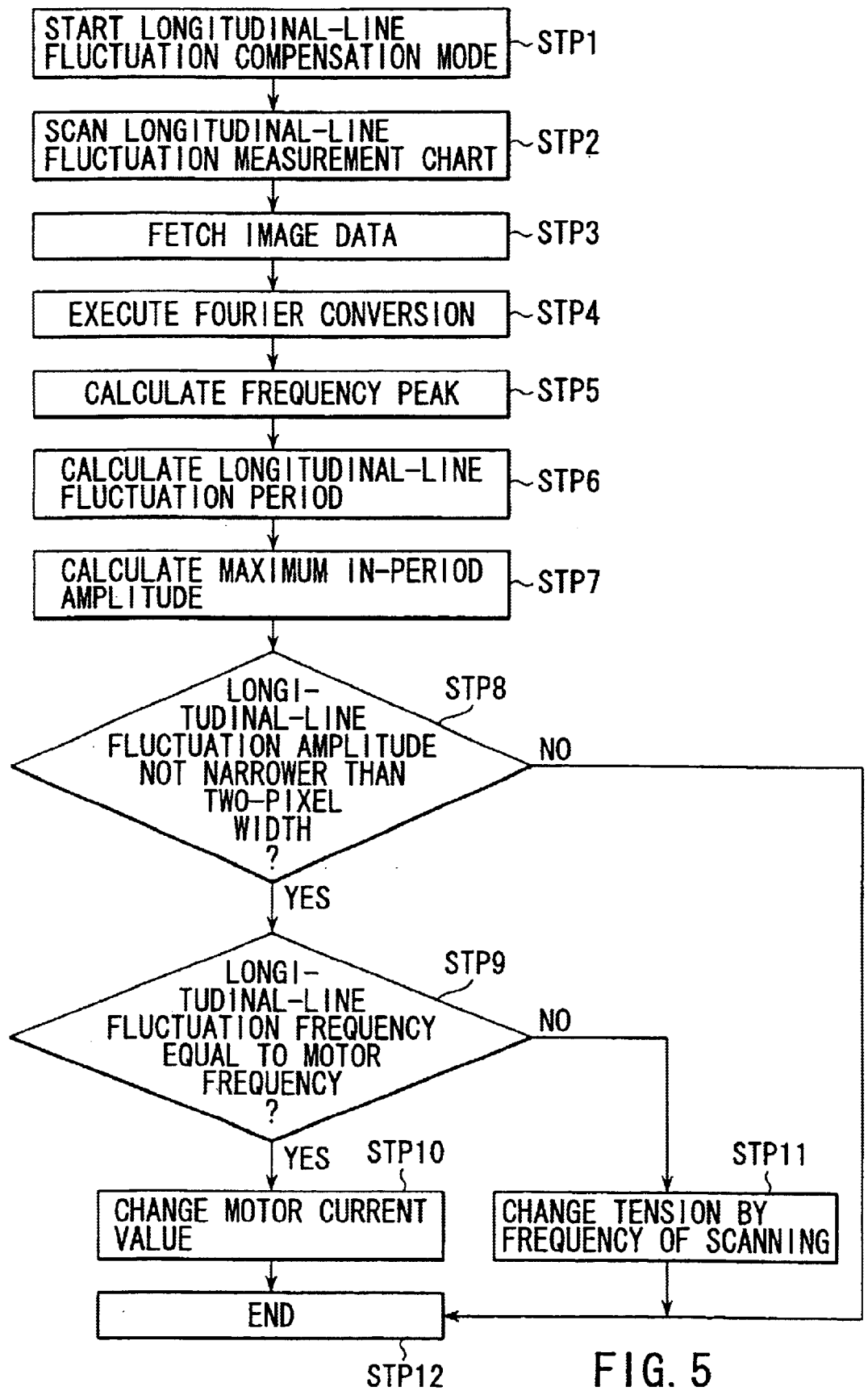
FIG. 5 is a flowchart for illustrating a method for reducing a longitudinal-line fluctuation in the image reader shown in FIGS. 2 to 4.

FIG. 5 is a flowchart for illustrating steps of procedure of longitudinal-line fluctuation correction, whereby the influence of a longitudinal-line fluctuation, which is caused as the first and second carriages of the scanner shown in FIGS. 2 to 4 are moved along the document glass, upon the image guided by means of the CCD sensor is obtained and reduced.

Figure 6:
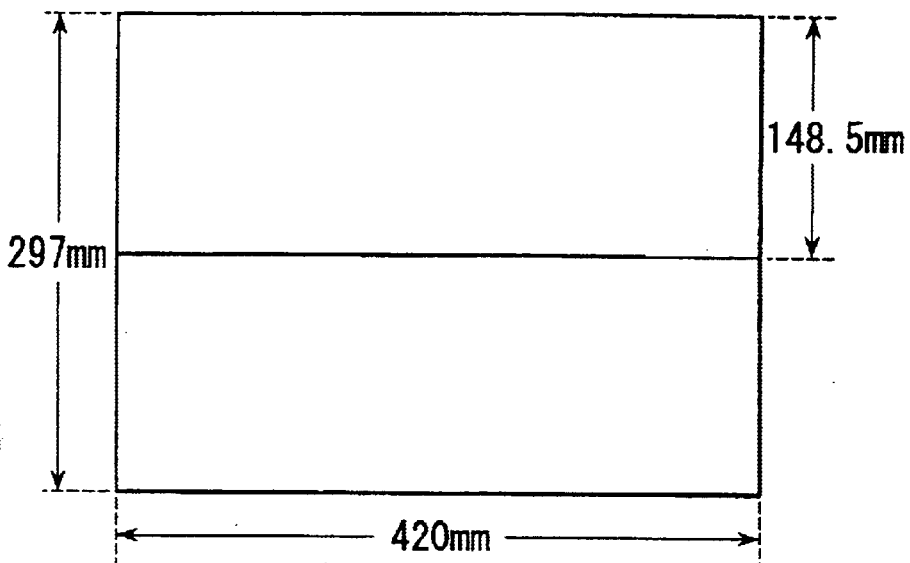
FIG. 6 is a schematic view illustrating an example of a longitudinal-line fluctuation measurement chart used in the longitudinal-line fluctuation reducing method shown in FIG. 5.

In the longitudinal-line fluctuation compensation routine, as shown in FIG. 5, a serviceman connects the scanner 102 and the longitudinal-line fluctuation detector PC that is furnished with FFT analysis software, thereby starting a longitudinal-line fluctuation compensation mode. Thereupon, the CPU 120 reads a longitudinal-line fluctuation diagnosis mode program that is stored in the ROM 126 in the scanner 102 described with reference to FIG. 4. As shown in FIG. 6, the longitudinal-line fluctuation measurement chart M is a chart in which a straight line with a one-dot width is formed in the moving direction of the first and second carriages 15 and 16, on a sheet of the maximum size that allows the scanner 102 to read the image information, e.g., size A3 (STP1).

Then, the image information of the longitudinal-line fluctuation measurement chart M that is set on the document glass 11 under the control of the CPU 120 is scanned in the same manner as the ordinary image information on the document D (STP2). The image information of the longitudinal-line fluctuation measurement chart M on the glass 11 is fetched as light gradation by the scanning operation of STP2, photoelectrically converted by means of the CCD sensor 12, and temporarily stored as image data in the RAM 127 (STP3).

The image data of the longitudinal-line fluctuation measurement chart M stored in the RAM 127 is fetched into the longitudinal-line fluctuation detector PC through the interface 300 and subjected to Fourier transform by means of the longitudinal-line fluctuation detector PC (STP4). The peak of the frequency is obtained from a frequency distribution that results from the Fourier transform (STP5).

Subsequently, the period of the longitudinal-line fluctuation is calculated from the frequency peak obtained in STP5 (STP6), and a maximum in-period amplitude or longitudinal-line fluctuation amplitude with which the amplitude has a maximum value in the period of the obtained longitudinal-line fluctuation is then calculated (STP7).

Then, whether or not the longitudinal-line fluctuation amplitude obtained in STP7 is not narrower than the width of two pixels is determined (STP8). If the longitudinal-line fluctuation amplitude is narrower than the two-pixel width (STP8-NO), it is concluded that the level of the longitudinal-line fluctuation is within its limits, and the longitudinal-line fluctuation compensation routine terminates (STP12).

If the longitudinal-line fluctuation amplitude obtained in STP7 is not narrower than the two-pixel width (STP8-YES), on the other hand, the frequency peak obtained in STP5 and the frequency of motor oscillation that depends on the value of the motor drive current supplied to the drive motor 21 are compared (STP9). If the fluctuation frequency of the motor 21 and the frequency peak obtained in STP5 are equal (STP9-YES), and the next motor drive current is set in accordance with data described later with reference to Table 1 and the value of the motor drive current presently supplied to the motor 21 (STP10), whereupon the longitudinal-line fluctuation compensation routine terminates (STP12).

If the fluctuation frequency of the drive motor 21 and the frequency peak obtained in STP5 are not equal (STP9-NO), on the other hand, the value of the tension on the wire rope 18 suited for the past number of image reading (operating time) is set in accordance with data described later with reference to Table 2, whereupon the longitudinal-line fluctuation compensation routine terminates (STP12).

The longitudinal-line fluctuation compensation routine described with reference to FIG. 5 is executed only during the serviceman's maintenance operation.

The data in Tables 1 to 3 that are referred to in STPs 10 and 11 are attributable to the fact that the respective natural frequencies of the drive motor 21 and a drive transmission system can be manipulated, in consideration of the deflection or oscillation of the drive motor 21 and the drive transmission system, including the toothed belts α and β, wire rope 18, etc., for use as a system that influences oscillation in the scanner 102, movement of the pulleys or backlash of the shaft, rigidity of the frame (not shown), and other factors.

More specifically, if the natural frequency (Hz) of the drive motor 21 is f; number of rotor teeth, ZR; maximum exciting torque (kg.cm), TH; gain, g; rotor inertia force (kg.cm$^2$), $J_O$; and load inertia force (kg.cm$^2$), $J_L$, the natural frequency f can be obtained according to $$f=\sqrt{[(ZR.TH.g)/(J_O+J_L)]}/2\pi, \qquad (1)$$

and can be manipulated by changing the maximum exciting torque TH that can be varied depending on the current value.

For the drive transmission system, on the other hand, the tension on the wire rope 18 can be changed by rotating for a given angle the wire motor 22 that is provided on that end portion of the wire rope 18 shown in FIG. 3 which is opposite from the fixed end. By doing this, the value of the drive current supplied to the drive motor 21 can be changed, and besides, the natural frequency f can be manipulated.

In this manner, the image data corresponding to the image information of the longitudinal-line fluctuation measurement chart M shown in FIG. 6 is fetched, the frequency distribution is obtained from the image data by means of the longitudinal-line fluctuation detector PC, and the amplitude of the longitudinal-line fluctuation is calculated from the obtained frequency distribution. The natural frequency of the first and second carriages 15 and 16 can be deviated from that of the drive motor 21 and/or the drive transmission system by changing the value of the drive current supplied to the motor 21 or the tension on the wire rope 18 in accordance with the amplitude of the longitudinal-line fluctuation. Thus, the possibility of the first and second carriages 15 and 16 resonating to the natural frequency of the drive motor 21 or the drive transmission system and unexpectedly oscillating can be lowered.

Figure 7:
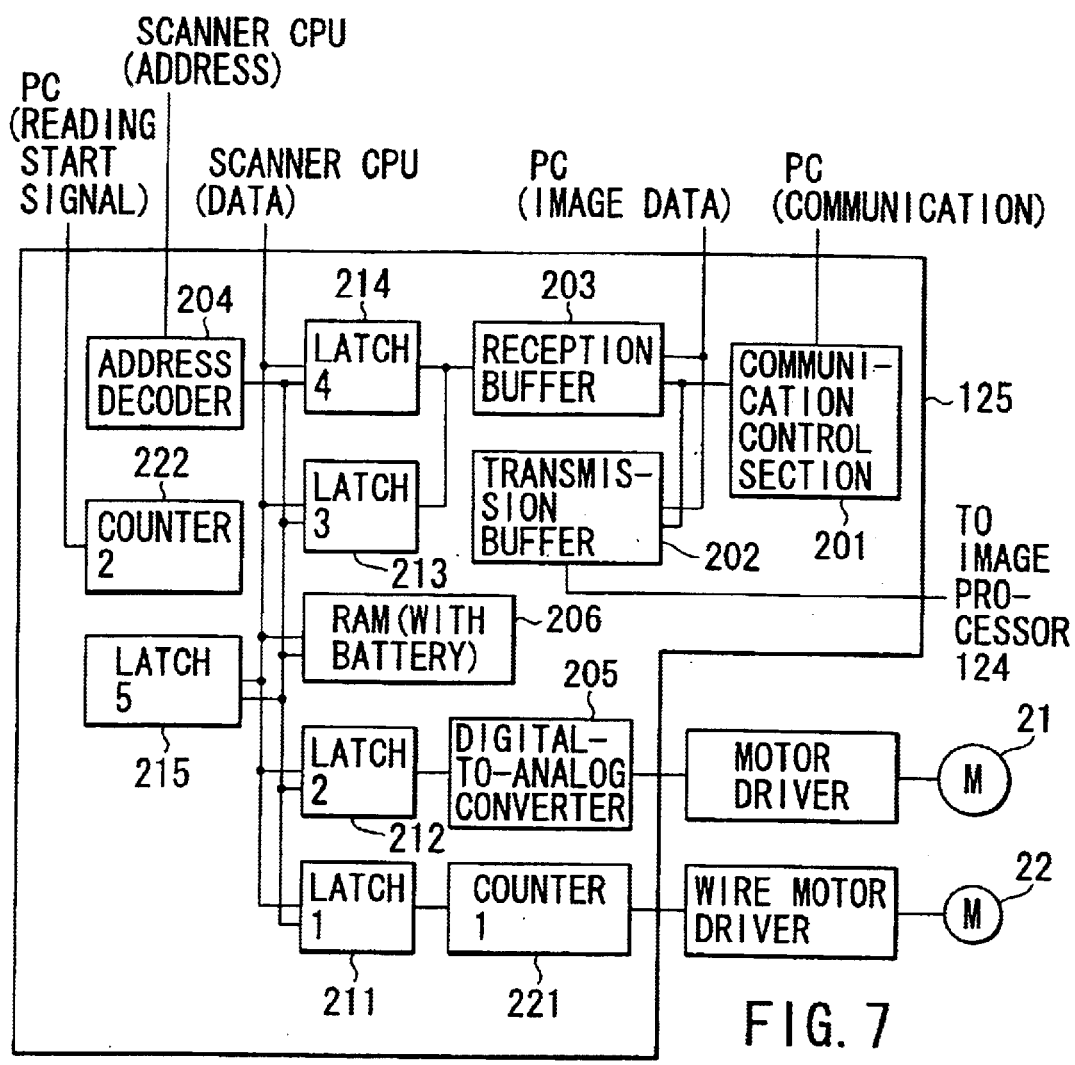
FIG. 7 is a block diagram illustrating an example of a configuration of a longitudinal-line fluctuation compensator used in the longitudinal-line fluctuation reducing method shown in FIG. 5.

FIG. 7 is a schematic view showing an example of the longitudinal-line fluctuation compensator 125 for achieving the longitudinal-line fluctuation compensation of STPs to 12 shown in FIG. 5.

The longitudinal-line fluctuation compensator 125 comprises a communication control section 201, transmission buffer 202, reception buffer 203, address decoder 204, digital-to-analog converter 205, RAM 206, etc. The communication control section 201 serves to control the delivery of data to and from the longitudinal-line fluctuation detector PC. The transmission buffer 202 is connected to an image data transfer control element (not shown) of the detector PC, image processor 124, reception buffer 203, and communication control section 201. The reception buffer 203 is connected to the image data transfer control element (not shown), communication control section 201, and transmission buffer 202. The address decoder 204 is connected to an address generator element (not described in detail) of the scanner CPU 120. The digital-to-analog converter 205 designates the value of the drive current to the motor driver 121 for driving the drive motor 21. The RAM 206 is of the battery-backup type. A first counter 221 and a first latch 211 are inserted on the reception-buffer side of the wire motor driver 122, while a second latch 212 is inserted on the reception-buffer side of the converter 205. Third and fourth latches 213 and 214 are inserted between the reception buffer 203, a data transfer control element (not shown) of the scanner CPU 120, and the address decoder 204. A second counter 222 and a fifth latch 215 are inserted between the data transfer control element of the scanner CPU 120, the address decoder 204, and a reading start signal output element (not shown) of the longitudinal-line fluctuation detector PC.

As shown in FIG. 7, the image data delivered from the CCD sensor 12 is applied to the transmission buffer 202 via the image processor 124. The transmission buffer 202 temporarily holds the image data according to the well-known FIFO (first-in-first-out, system in which received data are transmitted in due order), and discharges the image data toward the reception buffer 203 in synchronism with image transfer clocks. If the transmission buffer 202 has any effect data, a request signal REQ is transmitted from a communication control element 128 of the scanner 102 to a communication control section 301 of the interface 300 shown in FIG. 8. When an acknowledge signal ACK from the longitudinal-line fluctuation detector PC is received, the image data is transferred to the detector PC.

The image data delivered from the longitudinal-line fluctuation compensator 125 of the scanner 102 to the longitudinal-line fluctuation detector PC via the interface 300 is temporarily stored in a reception buffer 312 of the interface 300, and then loaded into a memory (RAM) 313.

A program in the longitudinal-line fluctuation detector PC is applied to the image data stored in the memory 313, whereby the longitudinal-line fluctuation level is calculated.

Figure 9:
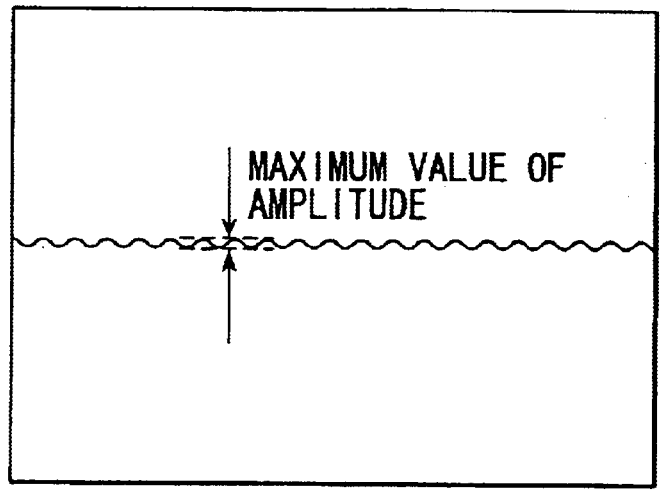
FIG. 9 is a schematic view illustrating an example of data obtained when the longitudinal-line fluctuation measurement chart shown in FIG. 6 is read, in the longitudinal-line fluctuation reducing method shown in FIG. 5.
Figure 10:
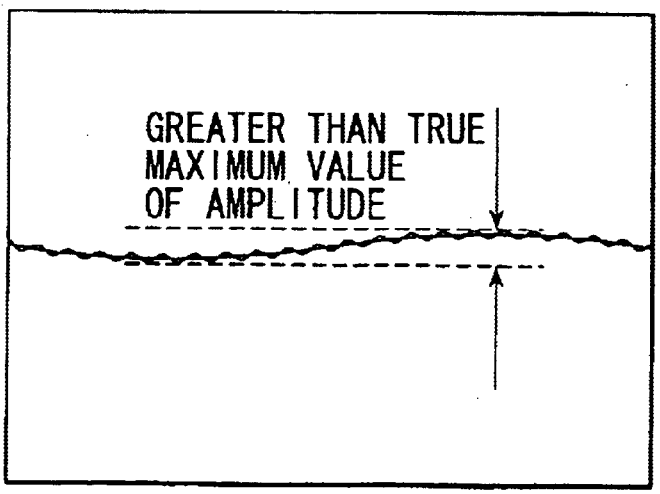
FIG. 10 is a schematic view illustrating an example of data such that the level of the longitudinal-line fluctuation obtained when the longitudinal-line fluctuation measurement chart shown in FIG. 6 is read exceeds its limit value, in the longitudinal-line fluctuation reducing method shown in FIG. 5.

The longitudinal-line fluctuation can be calculated by obtaining the maximum value of the amplitude of the longitudinal-line fluctuation, as shown in FIG. 9. Actually, however, the entire line may considerably fluctuate, as shown in FIG. 10, in some cases. If the maximum value of the amplitude of the longitudinal-line fluctuation is obtained in this state, it is inevitably greater than the actual maximum value of the amplitude of the longitudinal-line fluctuation. Accordingly, a true longitudinal-line fluctuation level is calculated in the following manner.

First, the image data is subjected to Fourier transform (corresponding to STP4 of FIG. 5) according to the FFT analysis program in the longitudinal-line fluctuation detector PC.

Figure 11:
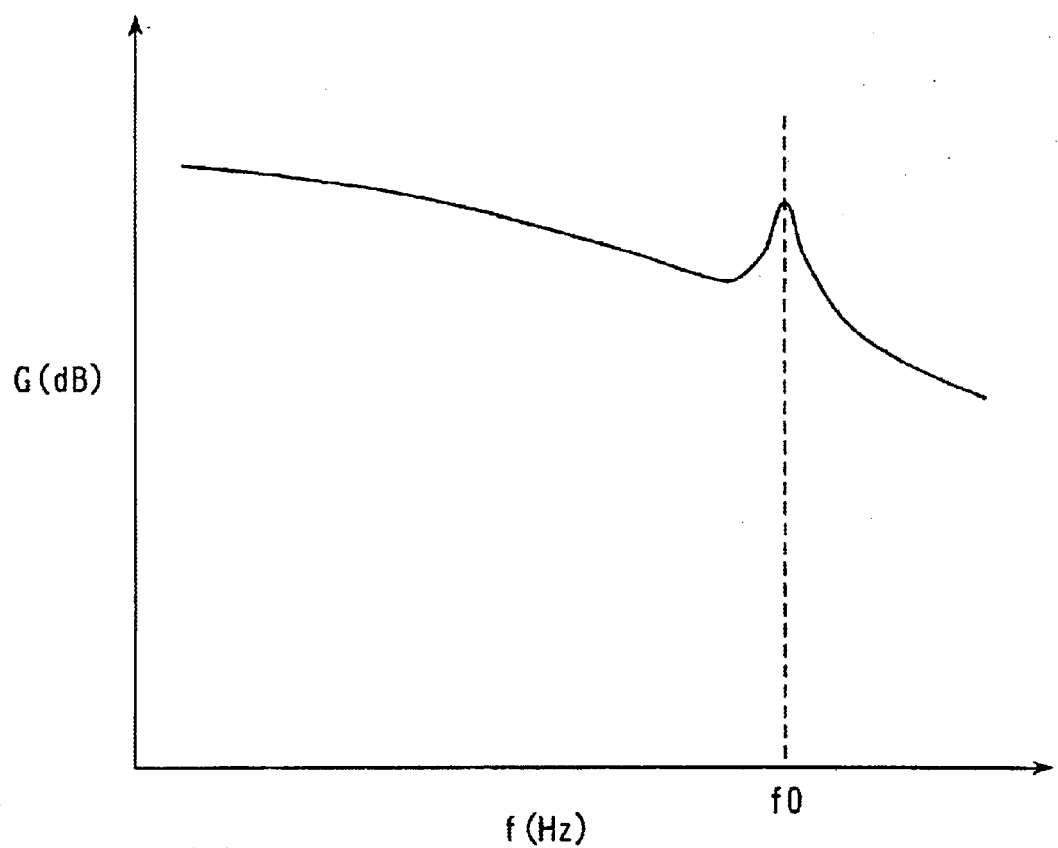
FIG. 11 is a graph showing data obtained when the result of reading of the longitudinal-line fluctuation measurement chart shown in FIG. 6 is subjected to Fourier conversion, in the longitudinal-line fluctuation reducing method shown in FIG. 5.

Thereupon, a peak appears in a certain frequency region, as shown in FIG. 11. This is the frequency of the longitudinal-line fluctuation (corresponding to STP5 of FIG. 5).

Figure 12:
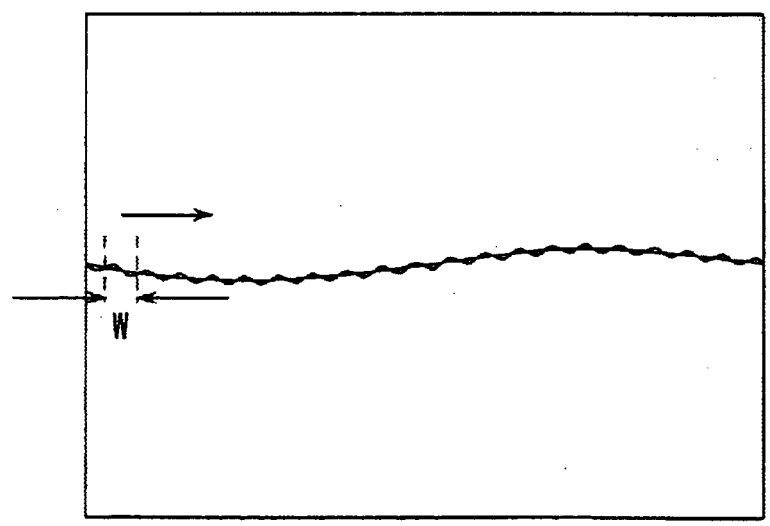
FIG. 12 is a schematic view for illustrating processes for obtaining a maximum value of data (FIGS. 9 and 10) obtained when the longitudinal-line fluctuation measurement chart shown in FIG. 6 is read using a period obtained by the Fourier conversion shown in FIG. 11, in the longitudinal-line fluctuation reducing method shown in FIG. 5.

At this point of time, a period W (mm) of the longitudinal-line fluctuation is calculated from the frequency and a scanning speed or the moving speed of the first carriage 15. If the frequency and the scanning speed are 120 Hz and 118 mm/s, respectively, the period of the longitudinal-line fluctuation is 0.98 mm (corresponding to STP6 of FIG. 5). If the period can be calculated, the maximum value of the amplitude of the longitudinal-line fluctuation is obtained within the range of this frequency, as shown in FIG. 12. The maximum value of the longitudinal-line fluctuation for every section is obtained with the frequency range shifted, whereby the maximum value is updated (corresponding to STP7 of FIG. 5).

By using this method or STPs 4 to 7 described with reference to FIG. 5, the true longitudinal-line fluctuation level can be obtained without being influenced by the fluctuation of the entire line.

The longitudinal-line fluctuation frequency and the longitudinal-line fluctuation amplitude calculated in the foregoing processes are transmitted to the scanner 102 through the interface 300. As this is done, the longitudinal-line fluctuation frequency and amplitude data are temporarily stored in a transmission buffer 311 of the interface 300, and the request signal REQ is transmitted from the communication control section 301 to the communication control element 128 of the scanner 102. The data are transmitted when the acknowledge signal ACK from the communication control element 128 of the scanner 102 is received.

The longitudinal-line fluctuation frequency and the longitudinal-line fluctuation amplitude transmitted in this manner are temporarily stored in the reception buffer 203 of the longitudinal-line fluctuation compensator 125 previously described with reference to FIG. 7, and are then timely loaded into the third and fourth latches 213 and 214, respectively.

Then, whether or not the amplitude of the longitudinal-line fluctuation returned from the longitudinal-line fluctuation detector PC is not narrower than the two-pixel width is determined.

As this is done, the address of the latch to which the address specified by the CPU 120 is allotted, that is, the address of the fourth latch 214 stored with the longitudinal-line fluctuation amplitude, is assigned for the address decoder 204 by the scanner CPU 120. Thus, the address decoder 204 reads the data stored in the fourth latch 214, and the CPU 120 determines whether or not the amplitude of the longitudinal-line fluctuation is not narrower than the two-pixel width (corresponding to STP8 of FIG. 5).

If the data of the fourth latch 214 read by means of the address decoder 204 is not greater than 1 (corresponding to STP8-NO of FIG. 5), it is concluded that the level of the longitudinal-line fluctuation is within its limits, and the longitudinal-line fluctuation compensation routine terminates (STP12).

If the longitudinal-line fluctuation amplitude is not narrower than the two-pixel width (corresponding to STP8-YES of FIG. 5), on the other hand, the longitudinal-line fluctuation frequency stored in the third latch 213 and the natural frequency of the drive motor 21 are compared. Thus, whether the cause of the longitudinal-line fluctuation amplitude at 2 or more is resonation between the motor 21 and the unit or any other resonation is determined (corresponding to STP9 of FIG. 5).

If the longitudinal-line fluctuation frequency and the natural frequency of the drive motor 21 are equal, then it is to be understood that the cause of the longitudinal-line fluctuation amplitude at 2 or more is resonation between the motor 21 and the unit. If not, then the cause is any other resonation. If the longitudinal-line fluctuation frequency and the natural frequency of the drive motor 21 are equal (corresponding to STP9-YES of FIG. 5), therefore, the value of the drive current supplied to the motor 21 is changed (corresponding to STP10-YES of FIG. 5), whereby the natural frequency of the motor 21 is changed. If the longitudinal-line fluctuation frequency and the natural frequency of the motor 21 are not equal (corresponding to STP9-NO of FIG. 5), on the other hand, the wire motor 22 is rotated for a given angle to change the tension on the wire rope 18, whereupon the natural frequency of the drive system is changed (corresponding to STP11 of FIG. 5).

The following is a description of a method for changing the value of the drive current supplied to the drive motor 21 and a method for rotating the wire motor 22 for the given angle to change the tension on the wire rope 18.

The natural frequency f of the drive motor 21 is previously stored in the battery-backup RAM 206 of the longitudinal-line fluctuation compensator 125 described before with reference to FIG. 7. In changing the value of the drive current supplied to the motor 21, a frequency F stored in the third latch 213 and the natural frequency f are compared by means of the scanner CPU 120. If there is a relation F=f, F=f/2, or F=2f, an indication for the digital-to-analog converter 205 stored in the RAM 206, that is, the drive current supplied from the converter 205 to the motor driver 121 is changed, so that the value of the motor current supplied to the drive motor 21 is changed.

The value of the motor current to be supplied to the drive motor 21 is stored as, for example, Table 1 in the battery-backup RAM 206 in association with the natural frequency.

Actually, moreover, one of indications for the digital-to-analog converter 205 in the RAM 206 is loaded into the second latch 212 under the control of the scanner CPU 120. The indication stored in the latch 212 is converted into an analog value by means of the digital-to-analog converter 205, and supplied as a reference voltage to the motor driver 121. Thus, as the reference voltage for the motor driver 121 is changed, the motor drive current supplied to the drive motor 21 is changed in proportion to it.

TABLE 1

| Current value (A) | Torque (kg) |
| --- | --- |
| 1.0 | 1 |
| 1.5 | 2.5 |
| 2.0 | 4 |

As the drive current supplied to the drive motor 21 is changed in this manner, the motor exciting torque is changed, so that the natural frequency f of the motor 21 is changed, as mentioned before. The natural frequency f of the drive motor 21 and the current value are related so that the drive current that is set at 1A at the time of shipment, for example, is first increased to 1.5A and secondly to 2A. Thirdly, however, the drive current is not changed, and a message to recommend replacement of the unit is displayed on a display element of the control panel (not shown) or the screen of a host computer that is connected to external equipment.

If the longitudinal-line fluctuation frequency F and the natural frequency f of the drive motor 21 are not equal, on the other hand, it is concluded, according to the sum total of frequencies of image reading, that the wire rope 18 is extended so that its tension is varied. Thereupon, the tension applied to the rope 18 is changed.

The relations shown in Table 2 are recognized between the tension applied to the wire rope 18, elongation of the rope 18, and number of image reading.

TABLE 2

| | Number of reading (n) | | | |
| --- | --- | --- | --- | --- |
| Tension | $15 \times 4 \leq$ | $70 \times 10^4 \leq$ | $10^6 \leq$ | |
| 2.5 kgf | 0.058 | 0.083 | 0.092 | unit of |
| 3.5 kgf | 0.059 | 0.084 | — | percent |
| 5.0 kgf | 0.078 | — | — | % |

In the case where the longitudinal-line fluctuation frequency F and the natural frequency f of the drive motor 21 are not equal, therefore, the length of the wire rope 18 is kept at its initial value with the set value of the wire tension at 2.5 kgf and with the number of image reading ranging from 0 to $150 \times 10^3$. The rope length is shortened by 0.058% with the number of image reading ranging from $150 \times 10^3$ to $700 \times 10^3$; by 0.083% with $700 \times 10^3$ to $1 \times 10^6$, and by 0.092% with $1 \times 10^6$ and above.

A count value in the second counter 222 is used as the number of image reading. If a stepping motor used as the wire motor 22 is of the two-phase type, its step angle is 1.8°. If the diameter of the pulley on the wire motor 22 is 50 mm, therefore, the length of the wire rope 18 changes by 0.079 mm for each pulse. Thus, 0.058% corresponds to 96 pulses. This value is loaded into the first latch 211, and pulses are generated by means of the counter and delivered to the wire motor driver 122, whereupon the wire motor 22 is rotated for the given angle.

In the case where the longitudinal-line fluctuation frequency F and the natural frequency f of the drive motor 21 are not equal, moreover, the length of the wire rope 18 extends in accordance with the set value of the wire tension, as shown in Table 2, for example. As shown in Table 3, therefore, the wire tension on the wire rope 18 can be approximated to a fixed value by rotating the wire motor 22 for the given angle in accordance with the wire tension and the frequency image reading.

TABLE 3

| | Number of reading (n) | | | |
| --- | --- | --- | --- | --- |
| Tension (kgf) | 0 to $15 \times 10^4$ | $15 \times 10^4$ to $70 \times 10^5$ | $7 \times 10^5$ to $10^6$ | |
| 2.5 kgf | 0.058 | 0.083 | 0.092 | unit of |
| 3.5 kgf | 0.059 | 0.084 | — | percent |
| 5.0 kgf | 0.078 | — | — | (%) |

Proportionally distributed so that each tabulated value corresponds to the upper limit value in each block In the case where the set value of the wire tension of Table 3 is 2/5 kgf, for example, the length of the wire rope 18 is shortened in regular order by proportional distribution within the range of 0 to 0.058% with the number of image reading ranging from 0 to 0 to $150 \times 10^3$. Likewise, the length of the rope 18 is shortened in regular order by proportional distribution within the range of 0.058% to 0.083% with the frequency ranging from $150 \times 10^3$ to $700 \times 10^3$. Likewise, moreover, the rope length is shortened in regular order by proportional distribution within the range of 0.083% to 0.092% with the frequency ranging from $700 \times 10^3$ to $1 \times 10^6$.

In the image reader of the present invention, as described above, the tension that is applied to the wire rope for transmitting the torque of the drive motor, which generates the driving force for moving the first and second carriages along the document glass, or the driving force of the drive motor to the two carriages is changed according to the measured resonance frequency. By doing this, the possibility of the carriages resonating to the natural frequency of the drive motor or the wire rope and unexpectedly oscillating, thereby rendering the read image data noisy or lowering the image quality, can be lowered.

Further, an image quality not lower than a fixed level can be provided for a long period of time by changing the natural frequency of the drive motor or the wire rope in accordance with the sum total of frequencies of image reading.

Furthermore, the serviceman can adjust the tension on the wire rope and the torque of the drive motor in accordance with the sum total of frequencies of image reading. Even in case the quality of the image data read according to the sum total of frequencies of image reading is lowered, therefore, it can be easily improved without requiring overhaul.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reader comprising:
   a CCD sensor for converting image information into image data composed of electrical signals;
   a mirror set for transmitting image data on an object of reading to the CCD sensor;
   a movement mechanism for moving the mirror set and/or the object of reading at a given speed;
   a drive unit for applying driving force to the movement mechanism; and
   a driving force control mechanism adapted to change the value of drive current supplied to the drive unit when a peak of a fluctuation frequency detected by means of a fluctuation detector is equal to a natural frequency of the drive unit, the fluctuation detector being externally connectable and capable of processing an output signal from the CCD sensor and detecting the fluctuation frequency attained as the movement mechanism is moved.

2. An image reader according to claim 1, wherein said driving force control mechanism increases the drive current so that torque generated by the drive unit increases.

3. An image reader according to claim 1, further comprising a driving force transmission mechanism for transmitting the driving force generated by the drive unit to the movement mechanism.

4. An image reader according to claim 3, wherein said driving force transmission mechanism includes a wire rope having one end supported on a stepping motor so that the tension of the rope is changeable.

5. An image reader according to claim 4, wherein the volume of rotation of said stepping motor is changed according to a given rule when the peak of the fluctuation frequency detected by means of the fluctuation detector is equal to the natural frequency of the driving force transmission mechanism.

6. An image reader comprising:
   a CCD sensor for converting image information into image data composed of electrical signals,
   a mirror set for transmitting image data on an object of reading to the CCD sensor;
   a movement mechanism for moving the mirror set and/or the object of reading at a given speed;
   a drive unit for generating driving force;
   a driving force transmission mechanism for transmitting the driving force generated by the drive unit to the movement mechanism; and
   a transmission condition changing mechanism capable of changing a condition for the transmission of the driving force generated by the drive unit when a peak of a fluctuation frequency detected by means of a fluctuation detector is equal to a natural frequency of the drive unit, the fluctuation detector being externally connectable and capable of processing an output signal from the CCD sensor and detecting the fluctuation frequency attained as the movement mechanism is moved.

7. An image reader according to claim 6, wherein said driving force transmission mechanism is a wire rope, and said transmission condition changing mechanism can change tension on the wire rope.

8. An image reader according to claim 7, wherein said transmission condition changing mechanism includes a stepping motor.

9. An image reader according to claim 8, further comprising a driving force control mechanism adapted to change the value of drive current supplied to the drive unit when a peak of a fluctuation frequency detected by means of a fluctuation detector is equal to the natural frequency of the drive unit, the fluctuation detector being externally connectable and capable of processing an output signal from the CCD sensor and detecting the fluctuation frequency attained as the movement mechanism is moved and the peak of the fluctuation frequency.

10. An image reader according to claim 9, wherein said driving force control mechanism increases the drive current so that torque generated by the drive unit increases.

11. A method for detecting and restraining a fluctuation of an image of an image reader, comprising:
   transmitting image information on a straight-line image, extending in a first direction and having a length equal to the width of each pixel in a second direction perpendicular to the first direction, to a light receiving surface of a CCD sensor by means of a mirror set;
   moving the mirror set or the image in the first direction so that image data, continuous in the first direction and photoelectrically converted by means of the CCD sensor, is subjected to Fourier conversion;
   obtaining a frequency of a fluctuation of the image data obtained by the Fourier conversion and a maximum value of the amplitude thereof;
   comparing the frequency of the fluctuation with a natural frequency of a drive motor for generating driving force for moving the mirror set or the image in the case where the maximum value of the amplitude of the fluctuation is greater than a given value;
   increasing the level of current supplied to the drive motor in the case where the frequency of the fluctuation and the natural frequency are equal; and
   changing a condition for the transmission of the driving force from the drive motor to a mechanism for moving the mirror set or the image in the case where the frequency of the fluctuation and the natural frequency are not equal.

12. A method for detecting and restraining a fluctuation of an image of an image reader according to claim 11, wherein a device capable of obtaining the frequency of the fluctuation and the maximum value of the amplitude includes a portable personal computer.

13. A method for detecting and restraining a fluctuation of an image of an image reader according to claim 11, wherein the frequency of the fluctuation and the maximum value of the amplitude thereof are calculated according to an analysis program stored in a longitudinal-line fluctuation detector connectable to the outside and returned to the body of the apparatus through an interface.

14. A method for detecting and restraining a fluctuation of an image of an image reader according to claim 13, wherein the level of drive current supplied to the drive motor is controlled by means of a tap voltage of a digital-to-analog converter capable of settling the drive current level.

15. A method for detecting and restraining a fluctuation of an image of an image reader according to claim 13, wherein said mechanism for moving the mirror set or the image includes a wire rope, and said condition for the transmission of the driving force is tension applied to the wire rope.

16. An image reader comprising:
   a transparent plate member for holding a test chart carrying thereon an image extending in a first direction and having a length equal to the width of each pixel in a second direction perpendicular to the first direction;
   an illuminating device capable of illuminating the test chart set on the plate member, thereby obtaining a reflected light containing image information on the test chart;
   a CCD sensor for photoelectrically converting the reflected light and outputting image data corresponding to the image information;
   a mirror member for transmitting the reflected light toward the CCD sensor;
   a carriage member for moving the illuminating device and the mirror member along the transparent plate member;
   a motor for generating driving force;
   a driving force transmission member for transmitting the driving force generated by the motor to the carriage member; and
   an image data input-output section connected with a fluctuation detector externally connectable and capable of processing the image data delivered from the CCD sensor and detecting the fluctuation frequency attained as the carriage member is moved.

17. An image reader according to claim 16, wherein said fluctuation detector connectable to the image data input-output section includes a portable personal computer.

18. An image reader according to claim 16, wherein the frequency of the fluctuation and a maximum value of the amplitude thereof are calculated according to an analysis program stored in the fluctuation detector connectable to the outside and returned to the body of the apparatus through the image data input-output section.

19. A system capable of reducing fluctuation components of read image data attributable to oscillations of movable parts and movable components of an image reader having the movable parts and components and resonance of the whole image reader, comprising:
   a transparent plate member for holding an object of reading including a test chart;
   an illuminating device capable of illuminating the object of reading set on the plate member, thereby obtaining a reflected light containing image information on the object of reading;
   a CCD sensor for photoelectrically converting the reflected light and outputting image data corresponding to the image information;
   a mirror set for transmitting the reflected light toward the CCD sensor;
   a carriage member for moving the illuminating device and the mirror set along the transparent plate member;
   a motor for generating driving force;
   a driving force transmission member for transmitting the driving force generated by the motor to the carriage member; and
   an image data input-output section connected with a fluctuation detector externally connectable and capable of processing the image data delivered from the CCD sensor and detecting the fluctuation frequency attained as the carriage member is moved,
   wherein the image information on the test chart is transmitted to a light receiving surface of the CCD sensor by means of the mirror set,
   the image data continuous in a first direction, outputted as the image information on the test chart is photoelectrically converted by means of the CCD sensor when the mirror set or the test chart is moved in the first direction, is subjected to Fourier conversion by means of the fluctuation detector connected by means of the image data input-output section,
   the frequency of a fluctuation of the image data obtained by the Fourier conversion and a maximum value of the amplitude thereof are obtained,
   the frequency of the fluctuation is compared with a natural frequency of the drive motor for generating the driving force for moving the mirror set or the image when the maximum value of the amplitude of the fluctuation obtained by means of the fluctuation detector is greater than a given value,
   the value of current supplied to the drive motor is increased when the fluctuation frequency and the natural frequency are equal, and
   a condition for the transmission of the driving force from the drive motor to a mechanism for moving the mirror set or the image is changed when the fluctuation frequency and the natural frequency are not equal,
   in the case where the object of reading is the test chart containing the image information on a straight-line image having a length equal to the width of each pixel in a second direction perpendicular to the first direction.

* * * * *